United States Patent [19]
Webster

[11] Patent Number: 5,627,445
[45] Date of Patent: May 6, 1997

[54] SENSING PHASE CURRENT IN SWITCHED RELUCTANCE MACHINES

[75] Inventor: Paul D. Webster, Headingley, United Kingdom

[73] Assignee: Switched Reluctance Drives, Ltd., Harrowgate, United Kingdom

[21] Appl. No.: 472,958

[22] Filed: Jun. 7, 1995

[30] Foreign Application Priority Data

May 10, 1995 [GB] United Kingdom ............ 9509408

[51] Int. Cl.$^6$ ........................................... H02P 7/05
[52] U.S. Cl. ................ 318/701; 318/254; 318/685; 318/696
[58] Field of Search ..................... 318/138, 139, 318/254, 439, 685, 696, 701, 430, 431, 432, 433, 434

[56] References Cited

U.S. PATENT DOCUMENTS 3,813,589  5/1974  Boice.
4,143,308  3/1979  Deplante et al. .................. 318/138
4,611,157  9/1986  Miller et al. ...................... 318/696
4,731,570  3/1988  Lee .................................. 318/696
4,896,089  1/1990  Kliman et al. ..................... 318/701
5,424,624  6/1995  Senak, Jr. ......................... 318/701

FOREIGN PATENT DOCUMENTS 0074752  8/1982  European Pat. Off. .

Primary Examiner—Bentsu Ro
Attorney, Agent, or Firm—Arnold, White & Durkee

[57] ABSTRACT

A switched reluctance machine comprises a stator and a rotor and a winding for each phase of the stator. A single current sensor is arranged to sense current in the phase windings such that they are discriminated between according to the energization sequence of the windings by a controller, including a digital processor which counts the sensed currents and attributes the source of the currents counted among the phase windings according to a known phase winding energization sequence.

11 Claims, 2 Drawing Sheets

SENSING PHASE CURRENT IN SWITCHED RELUCTANCE MACHINES

FIELD OF THE INVENTION

This invention relates to sensing phase current in switched reluctance machines.

BACKGROUND OF THE INVENTION

The control of a switched reluctance machine can be subdivided into two notional stages. At lower speeds it is possible, within the time in which a rotor passes through its conduction angle with respect to a stator pole, to 'chop' control the phase winding current by turning the controlling switch arrangement on and off during the conduction angle. At higher speeds chop control gives way to 'single-pulse', control in which the current is either rising or falling within the conduction angle and there is no opportunity for chopping to take place.

While torque output is the ultimately controlled parameter, it is particularly important to monitor the phase winding currents in the machine to maintain effective control of the drive. While it is possible to derive a current reading from a direct electrical connection to each phase winding, it is likely to be safer in most situations to use electrically isolated techniques because of the high voltages at which the phase winding operates. To this end, it is known to use devices such as Hall-effect current sensors and flux nulling sensors to achieve a current reading. A suitable flux nulling sensor is the LT200-S manufactured by LEM S.A. of Geneva, Switzerland. It has also been proposed to use a Rogowski coil technique to derive a measure of current, for example in the manner disclosed in British Patent Application No. GB 2259150A.

Whereas it has been possible to replace the electrically connected techniques with the isolated sensors described above, it still requires the use of a single sensor per phase winding in a multiphase machine. An example of current sensors individual to each phase winding in a switched reluctance machine is shown in EP-A-0573198.

SUMMARY OF THE INVENTION

It is an object of the present invention to reduce the cost of current measurement sensors for a switched reluctance machine.

According to the present invention, there is provided a switched reluctance machine comprising a stator defining stator poles and having a plurality of phase windings, a rotor defining rotor poles, and an electrically isolated current sensor arranged in current sensing relationship with a plurality of the phase windings, the current sensor having an output that is indicative of current in each of the said plurality of phase windings in sequence.

The particular isolating quality of such devices as Hall-effect sensors, Rogowski coils and flux nulling sensors can be used to distinct advantage in a switched reluctance machine in which the phase windings carry phase currents in sequence. By counting the cycle of phases it is possible to determine the source of a corresponding output from the single current sensing device sensing current in more than one phase winding.

Alternatively, the phase in which the current flows can be identified from the actuation of the controlling switch means connected with the windings. When particular switch means are actuated it is possible to determine that the current sensed by the current sensing device is that associated with the phase of the actuated switch means.

While it is preferable that all the phase winding currents of a machine are sensed by the same sensor, it is equally possible to subdivide the phase windings into groups, each group having its own current sensing device. In this case, it is advantageous to include maximal temporal spacing between phase currents. For n groups (corresponding to n sensors) every nth phase in the phase cycle may be connected in the same group.

Alternatively, a connection common to the phase windings as a whole or to a particular group of phase windings could have a current sensor associated with it.

BRIEF DESCRIPTION OF THE DRAWINGS

The invention can be put into practice in various ways some of which will now be described by way of example with reference to the accompanying drawings in which.

DETAILED DESCRIPTION OF THE INVENTION

Figure 1:
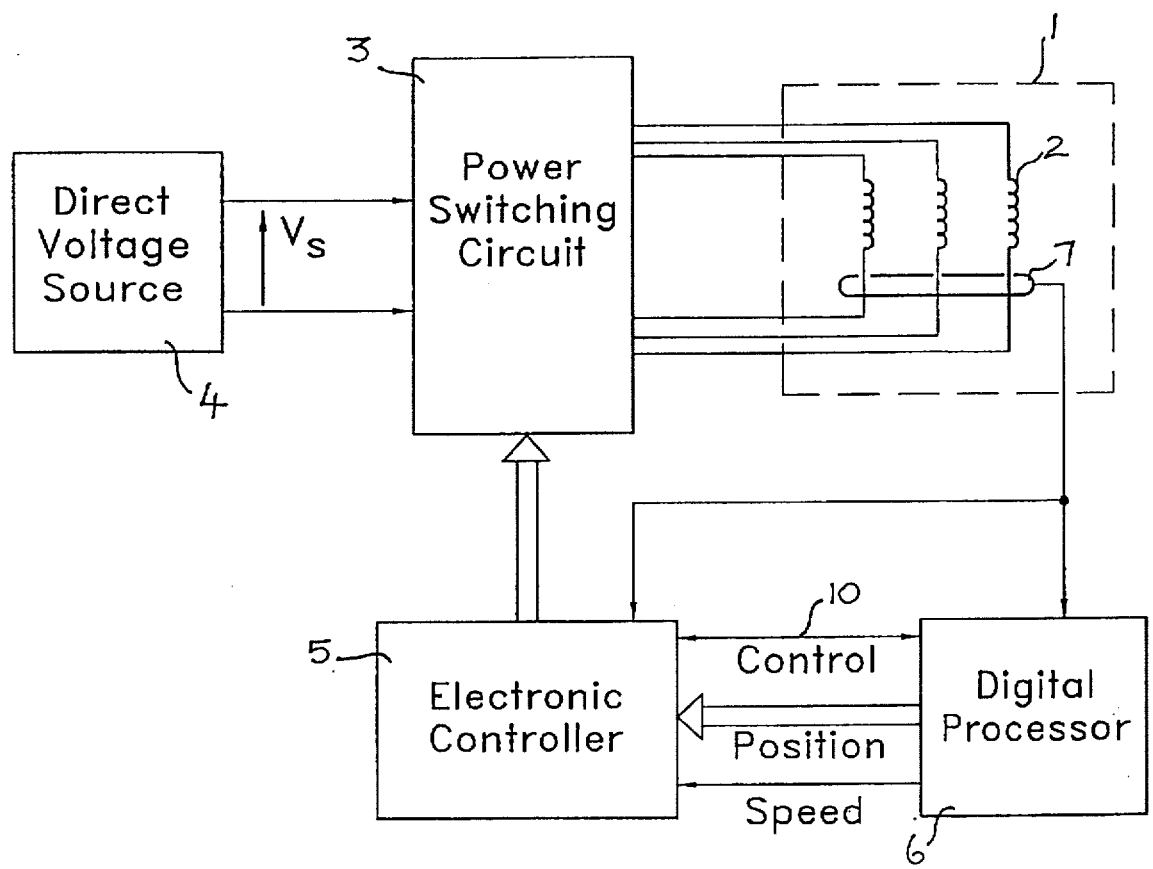
FIG. 1 is a block diagram of a switched reluctance drive system incorporating one embodiment of the present invention.

Referring to FIG. 1 of the drawings, a switched reluctance machine 1 has a number of phase windings 2 (in this case three) which are individually energized by means of a power switching circuit 3 containing semi-conductor switches and drawing power from (or returning power to) a direct voltage source 4. The direct voltage source may be a battery or be obtained by rectifying an ac mains supply. The semiconductor switches are turned on and off, depending on the rotor position, according to previously known strategies, by an electronic controller 5. To execute the strategies the electronic controller requires information on the phase currents and the rotor position and speed. In the embodiment shown, a digital processor 6 provides the required information.

The skilled person will appreciate that torque is produced by the rotor as an output when the switched reluctance machine is controlled to run as a motor. The same machine can be operated as a generator provided the control strategy of the controller is adjusted accordingly. For the sake of simplicity, the invention will be described in relation to a motor, but it applies equally to current sensing in the control of a generator.

The strategies used to control switched reluctance motors and generators are well known to the skilled person, as evidenced by the article "The Characteristics, Design and Applications of Switched Reluctance Motors and Drives", by Stephenson et al., PCIM 193, Jun. 21–24, 1993. The implementation of such strategies in software routines in the processor 6 will be well known to the skilled person.

The power switching is typically based on semiconductor technology. Examples of devices used include metal oxide silicon field effect transistors (MOSFET's), insulated gate bipolar transistors (IGBT's), gate turn-off thyristors (GTO's) and metal oxide silicon controlled thyristors (MCT's). These are all power switching devices.

In some circumstances mechanical switching could be used, such as electro-mechanical relays, but these are not particularly suited to high speed applications of switched reluctance motors and generators.

A variety of means suitable for determining the rotor position are known, eg. a rotor position transducer using optical or Hall-effect sensors, a resolver, a software algorithm which estimates the rotor position from a knowledge of currents and voltages in one or more windings, and the like.

Although for the convenience of illustration FIG. 1 shows the current transducer in a box representing the motor 1, in practice the transducer is more likely to be contained in the power switching circuit 3 so as to minimize the number of connections to the motor. A control signal interface 10 connects the electronic controller with the digital processor. The digital processor may also include analogue to digital converters to convert the measured values into digital form if necessary.

In accordance with this invention the single current sensor produces a similar output for each excitation of each of the three phase windings 2. It is not possible to distinguish between the phases from the current sensed by the transducer 7. The digital processor 6 is programmed to 'count' the instances of phase winding excitation and to assign a particular excitation to a phase accordingly. In the case of the circuit of FIG. 1 the three-phase motor shown will dictate that every third excitation is associated with the same phase winding. Likewise, on an n-phase machine (where n is greater than 1) every nth current sensor output can be counted as being associated with excitation of the same phase winding. The correctly counted current sensor outputs indicative of excitation of the windings are attributable to the phase windings in turn. The electronic controller 5 is then able to control the power switching circuit 3 for each individual sensor.

Figure 2:
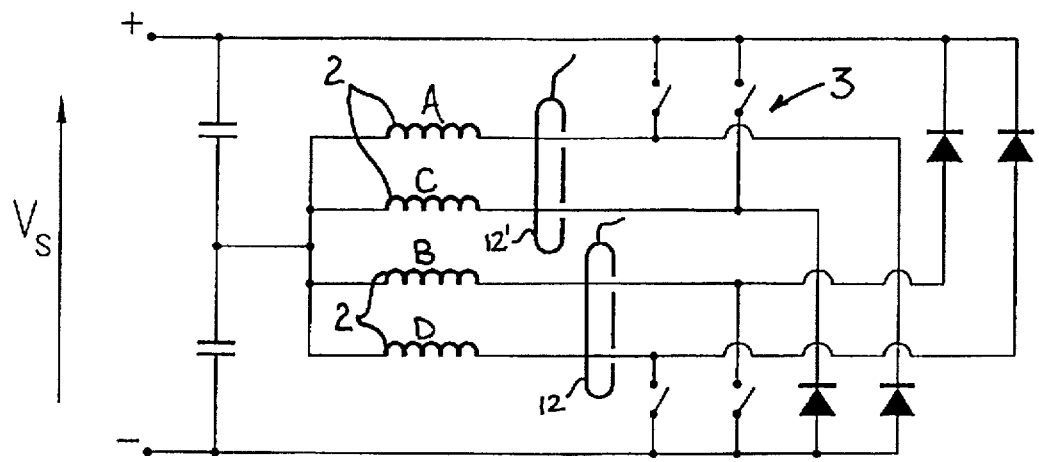
FIG. 2 is a circuit diagram of a power switching circuit incorporating an alternative embodiment of the present invention.

In an alternative embodiment, the phases of a switched reluctance motor may be sub-divided into groups as shown in FIG. 2. FIG. 2 is a circuit diagram of a known power switching circuit for switched reluctance machines with 4 phases. The phase windings 2 in a group (A/C or B/D) are arranged to have the same current sensor 12. The phases are so grouped that successive phases are energized from alternate sides of the midpoint of the two capacitors, thus ensuring that the capacitors remain balanced.

In this embodiment, the digital processor 6 is programmed to toggle between outputs from the different sensors and to attribute sensed current inputs to the phase windings accordingly.

Figure 3:
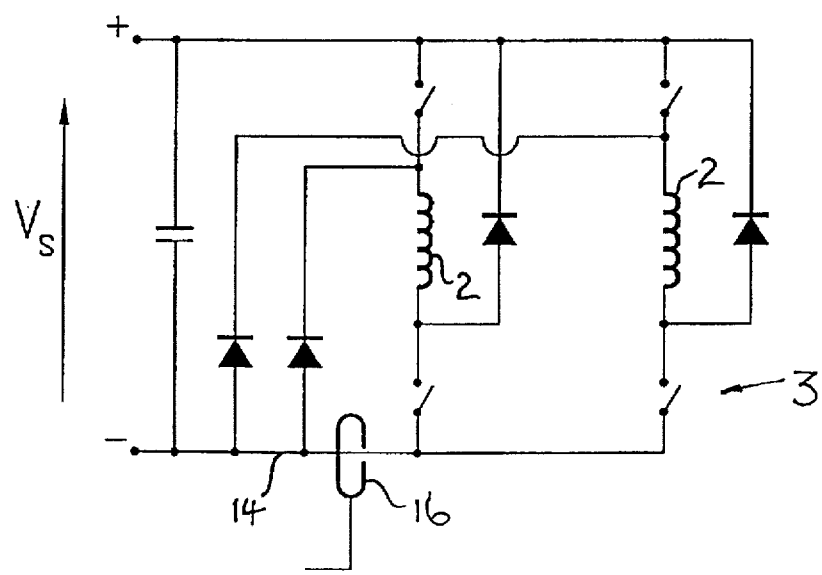
FIG. 3 is a circuit diagram of an alternative power switching circuit incorporating a further embodiment of the present invention.

While the above embodiments use a single current sensor to sense currents in a collection of phase windings by embracing separate current carrying conductors, it is equally possible to sense the current in a common part of the circuit through which the notionally grouped phase currents will pass. This is illustrated in FIG. 3 in which the common return line 14 for a known switching circuit for a two-phase machine is illustrated as having a single current sensor 16 arranged to sense current in it.

A reduction in the number of current sensors used in a switched reluctance drive system can realize a significant reduction in manufacturing cost, particularly when the drive system is intended for mass production.

The invention is described in relation to multiphase rotating switched reluctance machines. The skilled person will be aware that a switched reluctance machine can be constructed as a linear motor. The moving member of a linear motor is referred to in the art as a rotor. The term 'rotor' used herein is intended to embrace the moving member of a linear motor as well.

While the invention has been described in connection with the illustrative embodiments discussed above, those skilled in the art will recognize that many variations may be made without departing from the present invention. Accordingly, the above description of several embodiments is made by way of example and not for the purposes of limitation. The present invention is intended to be limited only by the scope of the following claims.

I claim:

1. A multi-phase switched reluctance machine comprising a stator, defining stator poles and having a plurality of phase windings, a rotor, defining rotor poles, and an electrically isolated current transducer arranged in current sensing relationship with at least a group of the phase windings, the current transducer having an output that is indicative of current in the group of phase windings wherein the current transducer is arranged to sense current in a separate electrical conductor associated with each phase winding in the group.

2. A machine as claimed in claim 1, including switch means for each phase winding, the current transducer being arranged to sense current passing through the switch means of the windings in the group.

3. A machine as claimed in claim 2 in which the switch means include semi-conductor switches.

4. A machine as claimed in claim 1 in which the transducer is arranged to sense current in all the phase windings of the machine.

5. A method of sensing winding current in a multi-phase switched reluctance machine having a stator, a rotor and a plurality of phase windings which are energizable in a sequence, the method comprising:

arranging an electrically isolated current transducer to be in current sensing relationship with a plurality of phase windings;

maintaining a count of the instances of phase winding energization; and attributing current sensed by transducer the according to the count as the rotor moves in a predetermined direction.

6. A method as claimed in claim 5 including:

arranging a first current transducer to sense the current in each of a first group of the phase windings and a second current transducer to sense the current in a second group of the phase windings.

7. A method as claimed in claim 6 in which the phase windings in a group are non-adjacent in the energization sequence of the phase winding.

8. A switched reluctance drive system comprising a multi-phase switched reluctance machine having a stator, a rotor and a winding for each phase of the machine, a switch arrangement for individually energizing the phase windings, a current transducer arranged in current sensing relationship with at least a group of the phase windings such that the transducer can sense freewheeling current in each of the group of phase windings, to produce an output indicative of current in each of the group of phase windings, a digital processor coupled to receive the output of the current transducer, wherein the digital processor assigns the output of the transducer to a particular phase winding and a controller connected to receive the output of the digital processor as an input and to control actuation of the switch arrangement for energizing the phase windings at least partly in response to the inputs from the digital processor.

9. A switched reluctance drive system comprising a multi-phase switched reluctance machine having a stator, a rotor and a winding for each phase of the machine, a switch arrangement for individually energizing the phase windings, a current sensor arranged in current sensing relationship with at least a group of the phase windings, to produce an output indicative of current in each of the group of phase windings, and a controller connected to receive the output of the current sensor as an input and to control actuation of the switch arrangement for energizing the phase windings at least partly in response to the inputs from the current sensor, wherein the controller includes a counter for registering the outputs of the current sensor, the counter being responsive to the count in determining the order of energization of the phase windings according to a sequence by actuation of the switch arrangement.

10. A system as claimed in claim 9 in which the current sensor is arranged to sense the current at the switch arrangement for each phase winding in the group.

11. A system as claimed in claim 9 in which the current is arranged to sense the phase winding currents in a conductor commonly connected with the phase windings.

* * * * *

UNITED STATES PATENT AND TRADEMARK OFFICE
CERTIFICATE OF CORRECTION

PATENT NO. : 5,627,445

DATED : May 6, 1997

INVENTOR(S) : Paul D. Webster

It is certified that error appears in the above-identified patent and that said Letters Patent is hereby corrected as shown below:

In claim 5, column 4, line 38, before "the" and following "by", please delete "transducer".

In claim 5, column 4, line 38, before "according" and following "the", please insert --transducer--.

Signed and Sealed this

Twenty-ninth Day of July, 1997

Attest:

Attesting Officer

BRUCE LEHMAN

Commissioner of Patents and Trademarks